United States Patent
Byrne et al.

(10) Patent No.: US 9,245,224 B2
(45) Date of Patent: *Jan. 26, 2016

(54) OPTIMALLY CONFIGURING AN INFORMATION LANDSCAPE

(71) Applicant: International Business Machines Corporation, Armonk, NY (US)

(72) Inventors: Brian P. Byrne, Austin, TX (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,394

(22) Filed: Mar. 25, 2014

(65) Prior Publication Data

US 2014/0201116 A1    Jul. 17, 2014

Related U.S. Application Data

(63) Continuation of application No. 13/467,315, filed on May 9, 2012, now Pat. No. 9,043,255.

(51) Int. Cl.
*G06N 5/00* (2006.01)
*G06F 1/00* (2006.01)
*G06N 3/08* (2006.01)

(52) U.S. Cl.
CPC . *G06N 3/08* (2013.01); *G06N 3/084* (2013.01)

(58) Field of Classification Search
CPC ........... G06F 17/50; G06F 17/11; G06N 3/08; G06Q 10/04
See application file for complete search history.

(56) References Cited

U.S. PATENT DOCUMENTS

| 5,546,507 A | 8/1996 | Staub |
| 5,625,552 A | 4/1997 | Mathur et al. |
| 5,875,285 A | 2/1999 | Chang |

(Continued)

OTHER PUBLICATIONS

Srinivasan et al., "Web-log-driven business activity monitoring," Computer, IEEE Computer Society, vol. 38, Issue 3, pp. 61-68, Mar. 2005.

(Continued)

*Primary Examiner* — Jeffrey A Gaffin
*Assistant Examiner* — Kalpana Bharadwaj
(74) *Attorney, Agent, or Firm* — Susan Murray; Edell, Shapiro & Finnan, LLC

(57) ABSTRACT

According to an embodiment of the present invention, a system optimizes an information processing environment, and comprises at least one processor. The system collects information pertaining to operational behavior of the information processing environment and including a plurality of parameters. A neural network structure is established to associate the parameters to a desired operational performance characteristic for the information processing environment. The neural network structure is trained with the collected information from the information processing environment to produce a model for the information processing environment. The model is optimized to determine values for the parameters and the information processing environment is adjusted based on the determined parameter values to attain the desired operational performance of the information processing environment. Embodiments of the present invention further include a method and computer program product for optimizing an information processing environment in substantially the same manner described above.

6 Claims, 5 Drawing Sheets

(56) References Cited

U.S. PATENT DOCUMENTS

| | | | |
|---|---|---|---|
| 6,134,555 A | 10/2000 | Chadha et al. | |
| 6,272,478 B1 | 8/2001 | Obata et al. | |
| 6,553,366 B1 | 4/2003 | Miller et al. | |
| 6,556,982 B1 | 4/2003 | McGaffey et al. | |
| 6,826,556 B1 | 11/2004 | Miller et al. | |
| 6,876,988 B2 | 4/2005 | Helsper et al. | |
| 7,058,560 B1 | 6/2006 | Arakawa et al. | |
| 7,058,615 B2 | 6/2006 | Yao | |
| 7,082,381 B1 | 7/2006 | Saghier et al. | |
| 7,523,118 B2 | 4/2009 | Friedlander et al. | |
| 7,580,848 B2 | 8/2009 | Eder | |
| 7,664,249 B2 | 2/2010 | Horvitz et al. | |
| 7,809,536 B1 | 10/2010 | Browning et al. | |
| 7,953,681 B2 | 5/2011 | Rai | |
| 2001/0054032 A1 | 12/2001 | Goldman et al. | |
| 2002/0152305 A1* | 10/2002 | Jackson et al. | 709/224 |
| 2004/0133531 A1 | 7/2004 | Chen et al. | |
| 2004/0243692 A1 | 12/2004 | Arnold et al. | |
| 2004/0268050 A1 | 12/2004 | Cai et al. | |
| 2005/0021733 A1 | 1/2005 | Clinton et al. | |
| 2005/0034105 A1 | 2/2005 | Hind et al. | |
| 2005/0052873 A1 | 3/2005 | Sokolov | |
| 2005/0137912 A1 | 6/2005 | Rao et al. | |
| 2005/0195383 A1 | 9/2005 | Breed et al. | |
| 2005/0209983 A1 | 9/2005 | MacPherson | |
| 2006/0025981 A1 | 2/2006 | Papaefstathiou et al. | |
| 2006/0085558 A1* | 4/2006 | Solomon | 709/238 |
| 2007/0022142 A1 | 1/2007 | Palmer et al. | |
| 2011/0131453 A1 | 6/2011 | Fernandess et al. | |
| 2011/0321164 A1 | 12/2011 | Saxena et al. | |
| 2012/0185416 A1* | 7/2012 | Baras et al. | 706/12 |
| 2012/0307647 A1* | 12/2012 | King et al. | 370/241 |
| 2013/0304682 A1 | 11/2013 | Byrne et al. | |

OTHER PUBLICATIONS

Khanh V. Nguyen, "A Nonlinear Neural Network for Solving Linear Programming Problems", https://engineering.purdue.edu/~dynamic/public-web/neuralnet_new.pdf, retrieved from internet on May 8, 2012, pp. 1-9.

"Linear programming", http://en.wikipedia.org/wiki/Linear_programming, retrieved from the internet on May 7, 2012, pp. 1-21.

Uttamchandani et al., "MonitorMining: Creating Domain Knowledge for System Automation using a Gray-box Approach," IEEE, Jun. 2005, 14 pages.

* cited by examiner

OPTIMALLY CONFIGURING AN INFORMATION LANDSCAPE

CROSS-REFERENCE TO RELATED APPLICATIONS

This application is a continuation of U.S. patent application Ser. No. 13/467,315, entitled "OPTIMALLY CONFIGURING AN INFORMATION LANDSCAPE" and filed May 9, 2012, the disclosure of which is incorporated herein by reference in its entirety.

BACKGROUND

1. Technical Field

Present invention embodiments relate to information landscapes, and more specifically, to configuring an information landscape with optimal parameters based on a learning system.

2. Discussion of the Related Art

Large organizations tend to utilize large complex information landscapes. Since organizations have grown organically, these organizations inherited a large range of partially duplicated, and often distributed, data processing nodes that handle a wide range of data sets.

The data integration elements of an information landscape (e.g., jobs, queries, batch loads, etc.) are typically constructed in isolation or localized sets. Accordingly, small consideration is typically given to the overall efficiency of the information landscape (due to the inherent complexity in measuring this efficiency), or to the impact of any change in the information landscape. In addition, the complex environment of the information landscape includes a wide range of technologies each with very different run time characteristics. Although experts in each system of the information landscape may be able to optimize individual routines or sets of routines, tuning the overall environment of the information landscape is extremely complex.

BRIEF SUMMARY

According to one embodiment of the present invention, a system optimizes an information processing environment, and comprises at least one processor. The system collects information pertaining to operational behavior of the information processing environment, wherein the collected information includes a plurality of parameters for the information processing environment. A neural network structure is established to associate the parameters to a desired operational performance characteristic for the information processing environment. The neural network structure is trained with the collected information from the information processing environment to produce a model for the information processing environment. The model is optimized to determine values for the parameters and the information processing environment is adjusted based on the determined parameter values to attain the desired operational performance of the information processing environment. Embodiments of the present invention further include a method and computer program product for optimizing an information processing environment in substantially the same manner described above.

DETAILED DESCRIPTION

Present invention embodiments pertain to optimally configuring an information landscape. The operational behavior of the information landscape is monitored based on logs and other pre-existing monitoring points. This information is provided to a learning system (e.g., a system of artificial neural networks (ANN), etc.) to derive adjustments to the operational environment of the information landscape. These adjustments are subsequently applied to the information landscape, thereby enabling a closed loop analysis and progressive optimization of the information landscape.

Present invention embodiments employ a true operational environment, as opposed to a simulation where inherent errors increase drastically as the complexity of the operational environment increases. Further, present invention embodiments utilize a closed loop learning system. This obviates human actors being involved in the search for areas of optimization within the information landscape, and avoids biasing of the optimization to the areas of specialization of the human actors.

Present invention embodiments provide the ability to optimize information landscapes without the inherent issues involved in building an accurate model of these landscapes (e.g., the inherent error margins, etc.). Further, present invention embodiments may optimize across multiple different technical platforms and support iterative ongoing optimization of the information landscape. In addition, since no human intervention is needed, the inherent biases of human tuning of the information landscape are eliminated.

Figure 1A:
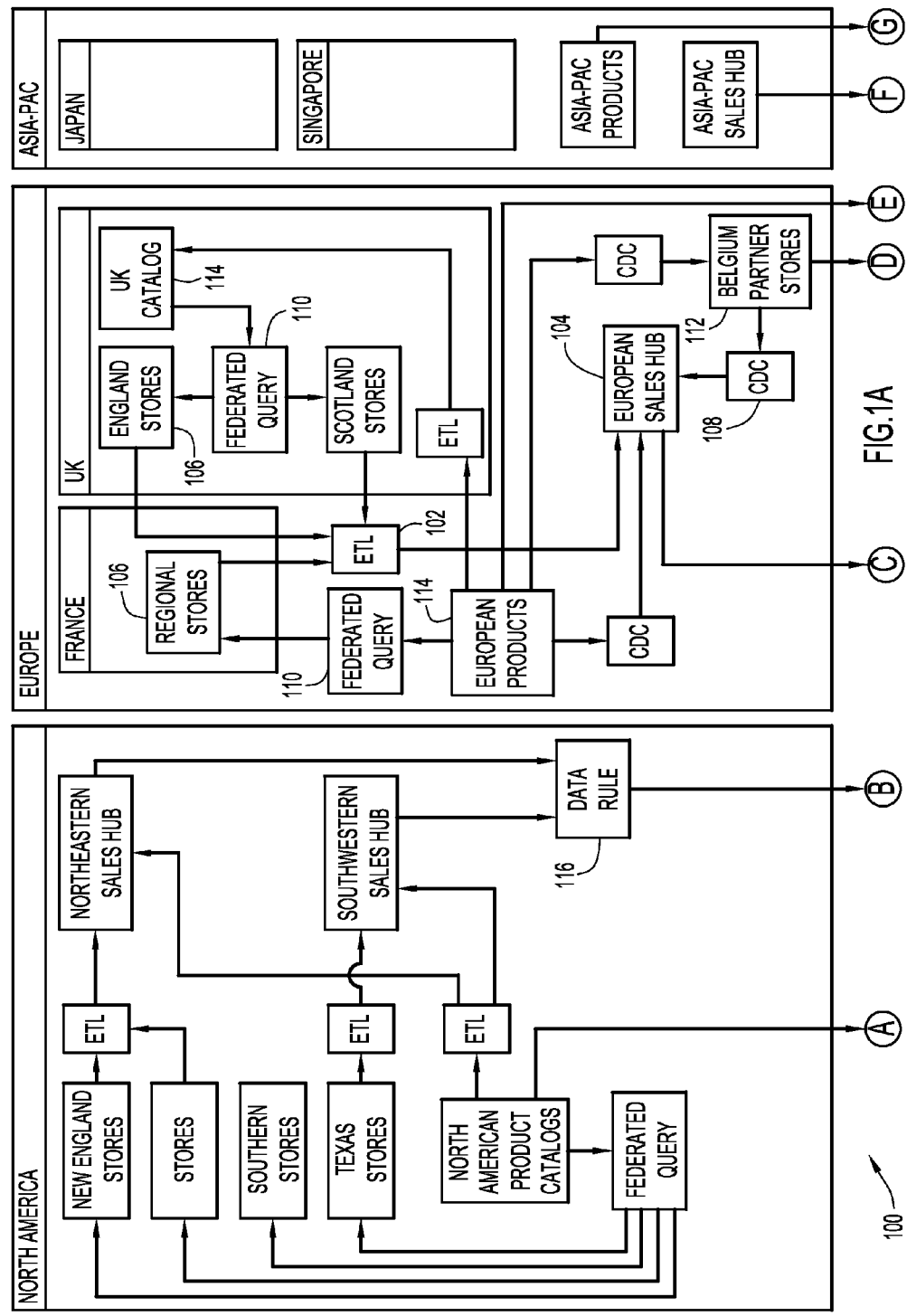
FIGS. 1A-1B are a diagrammatic illustration of an example information landscape environment for use with an embodiment of the present invention.
Figure 1B:
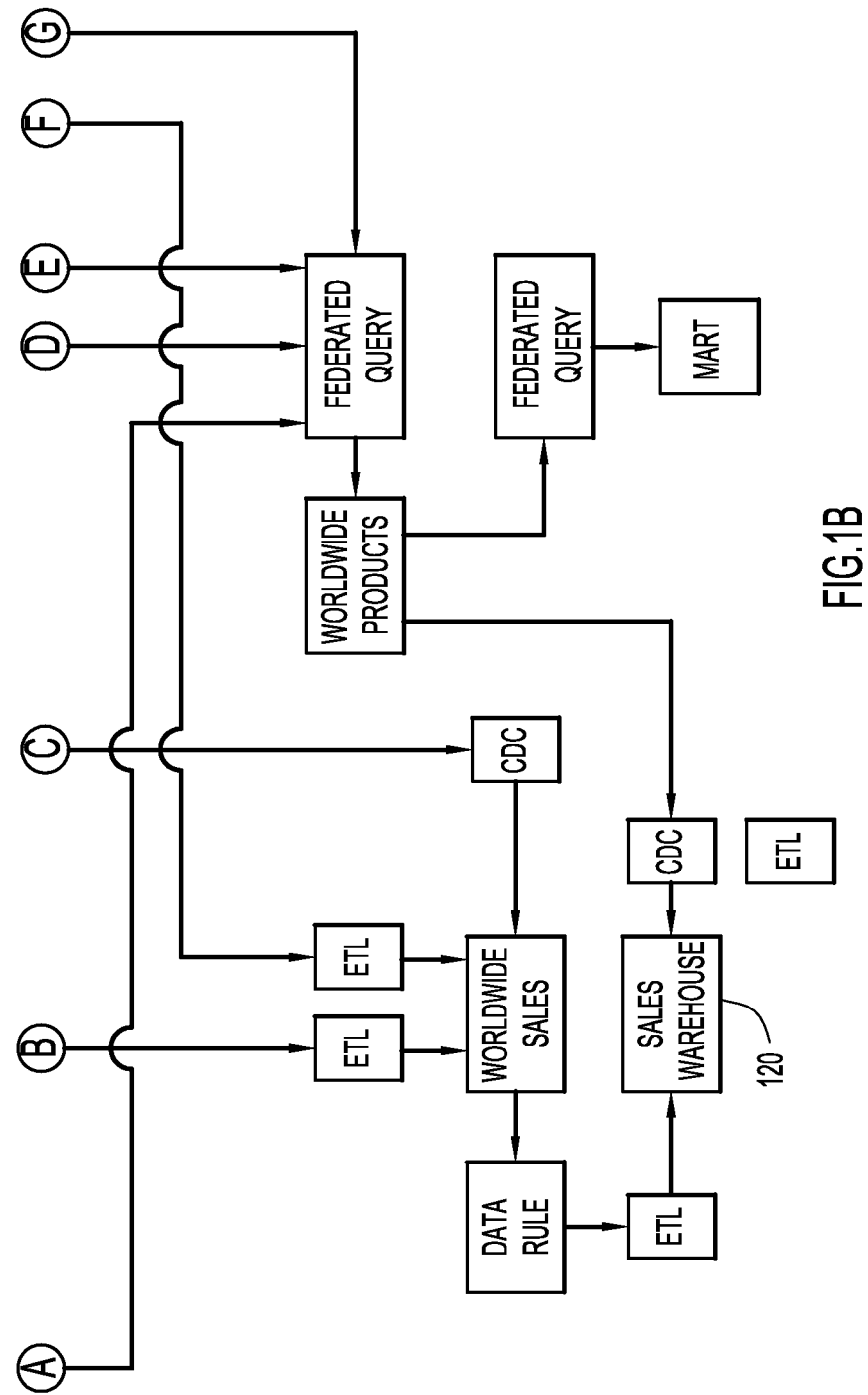

An example information landscape for use with present invention embodiments for optimal configuration is illustrated in FIGS. 1A-1B. In particular, information landscape 100 may be operated by a large distributed organization, and include a complex data integration environment. The environment feeds transactional and stock level data from operational retail stores into a data warehouse for analysis of buying characteristics in order to determine optimum re-stocking procedures based on customer buying patterns. The information landscape includes batch Extract Transform Load (ETL) operations 102 for plural distributed store-level systems 106. The ETL operations provide data through regional hubs 104 to a central warehouse 120. The information landscape may employ a range of other data integration techniques to perform various data operations, including a change data capture (CDC) 108 (e.g., from partner stores 112), federated queries 110 that may be applied against plural sources (e.g., product catalogs 114), and data rules 116. Present invention embodiments are not limited to the information landscape with the specific configuration or applications described above, but may be utilized to configure any information landscape having any desired configuration.

Figure 2:
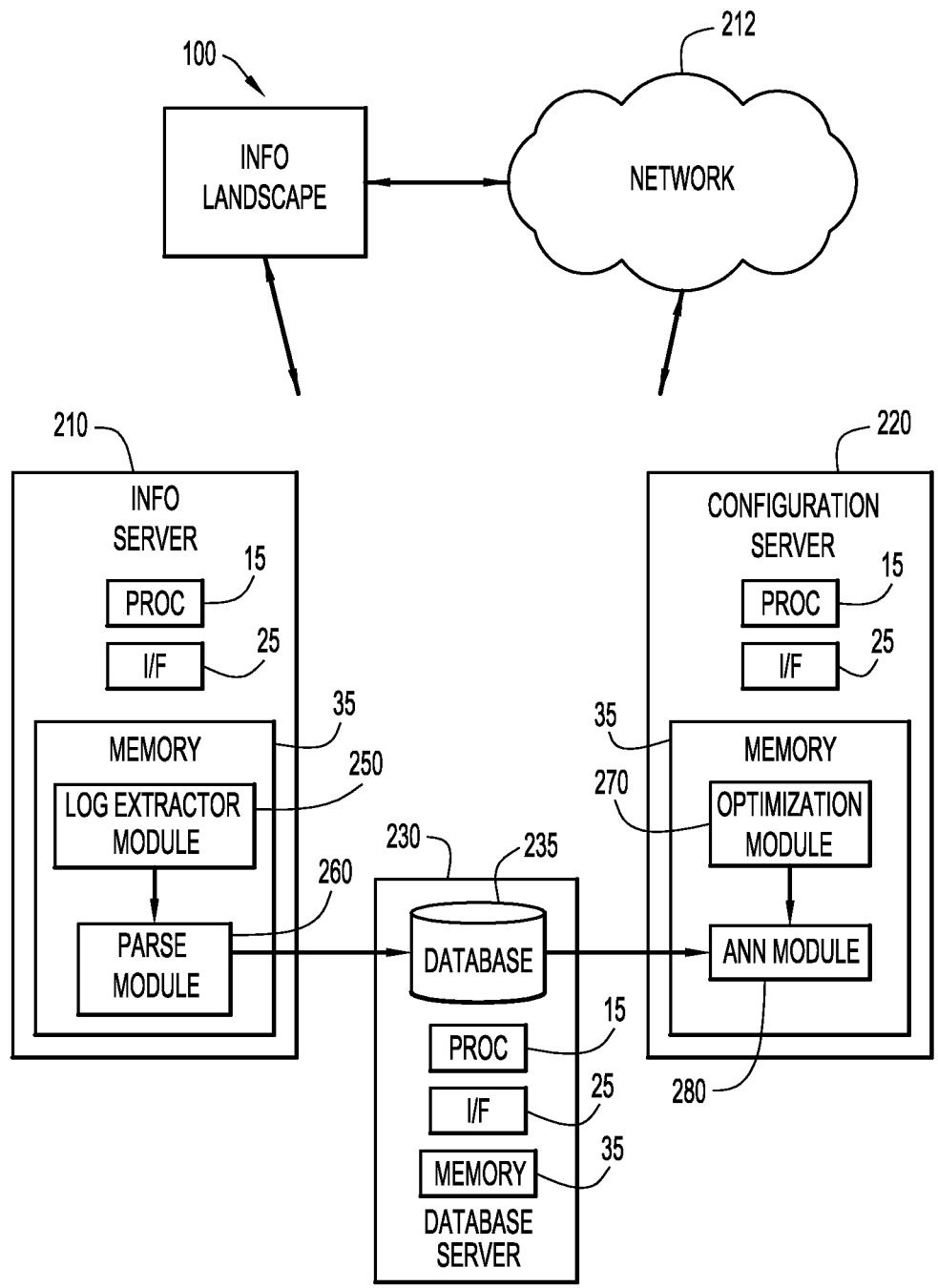
FIG. 2 is a diagrammatic illustration of an example computing environment according to an embodiment of the present invention.

An example computing environment of a present invention embodiment for configuring information landscapes is illustrated in FIG. 2. In particular, a computing environment 200 includes an information server system 210, a configuration server system 220, and a database server system 230 with a database 235. The computing environment is in communication with, or may be embedded within, information landscape 100.

Server systems 210, 220, 230 may be remote from each other and information landscape 100, and communicate over a network 212. The network may be implemented by any number of any suitable communications media (e.g., wide area network (WAN), local area network (LAN), Internet, Intranet, etc.). Alternatively, server systems 210, 220, 230 may be local to each other and information landscape 100, and communicate via any appropriate local communication medium (e.g., local area network (LAN), hardware, wireless link, Intranet, etc.). In addition, server systems 210, 220, and/or 230 may be included within information landscape 100.

Information server system 210 includes a log extractor module 250 and a parse module 260. The log extractor module extracts logs from the different components (e.g., ETL operations 102, hubs 104, CDC 108, federated queries 110, data rules 116, etc.) within information landscape 100. The logs include information pertaining to the operation of the information landscape. Parse module 260 processes the log information for storage in database 235 of database server system 230. The database server system may store various information for the control of information landscape 100 (e.g., log information, model, configurations and/or parameters, etc.). The database may be implemented by any conventional or other database or storage unit, may be local to or remote from server systems 210, 220 and information landscape 100, and may communicate via any appropriate communication medium (e.g., local area network (LAN), wide area network (WAN), Internet, hardwire, wireless link, Intranet, etc.).

Configuration server system 220 includes an optimization module 270 and an artificial neural networks (ANN) module 280. Neural networks module 280 utilizes a series of coupled neural networks and the captured data within database 235 to provide a model for mapping the configurable portions (e.g., variables or parameters) of information landscape 100 to a desired operational performance. Optimization module 270 optimizes the model produced from the neural networks to determine an optimal configuration (optimal variable or parameter values) for information landscape 100. The information landscape configuration is adjusted based on the optimization in order to alter information landscape operation and attain the desired operational performance.

Server systems 210, 220 may present a graphical user (e.g., GUI, etc.) or other interface (e.g., command line prompts, menu screens, etc.) to solicit information from users pertaining to the desired information landscape operational performance, and may provide reports or displays including various information.

Server systems 210, 220, 230 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, log extractor module, parse module, optimization module, artificial neural networks module, etc.).

Log extractor module 250, parse module 260, optimization module 270, and artificial neural networks module 280 may include one or more modules or units to perform the various functions of present invention embodiments described below. The various modules (e.g., log extractor module, parse module, optimization module, artificial neural networks module, etc.) may be implemented by any combination of any quantity of software and/or hardware modules or units, and may reside within memory 35 of the server systems for execution by processor 15.

Present invention embodiments employ a neural network structure to learn a weighted model that relates parameters of the information landscape to a desired system output representing one or more attributes or characteristics of operational performance. For example, simple characteristics of information landscape 100 (FIGS. 1A-1B) may be utilized for iterative tuning of the information landscape to maximize records processed/second throughput (which is distinct from optimizing the elapsed time of data processing). The parameters of the information landscape that may be utilized for this example include: macro-type of integration routines (e.g., indicating the effect of switching certain suitable ETL routines to be CDC replications); micro-type of routines (e.g., indicating the effect of switching from server to parallel ETL jobs); batch size for routines (e.g., ranging from processing one record at a time, then releasing control, all the way to processing every record in one iteration); execution timing of routines (e.g., time of day); execution location of routines (e.g., combination of servers executing the routines); sequencing of routines (e.g., although some sequencing is mandatory, a large data integration environment may include considerable variance in the ordering of routines); and parallelism of routines (e.g., ranging from executing each routine in series through degrees of parallelizing different routines).

Figure 3:
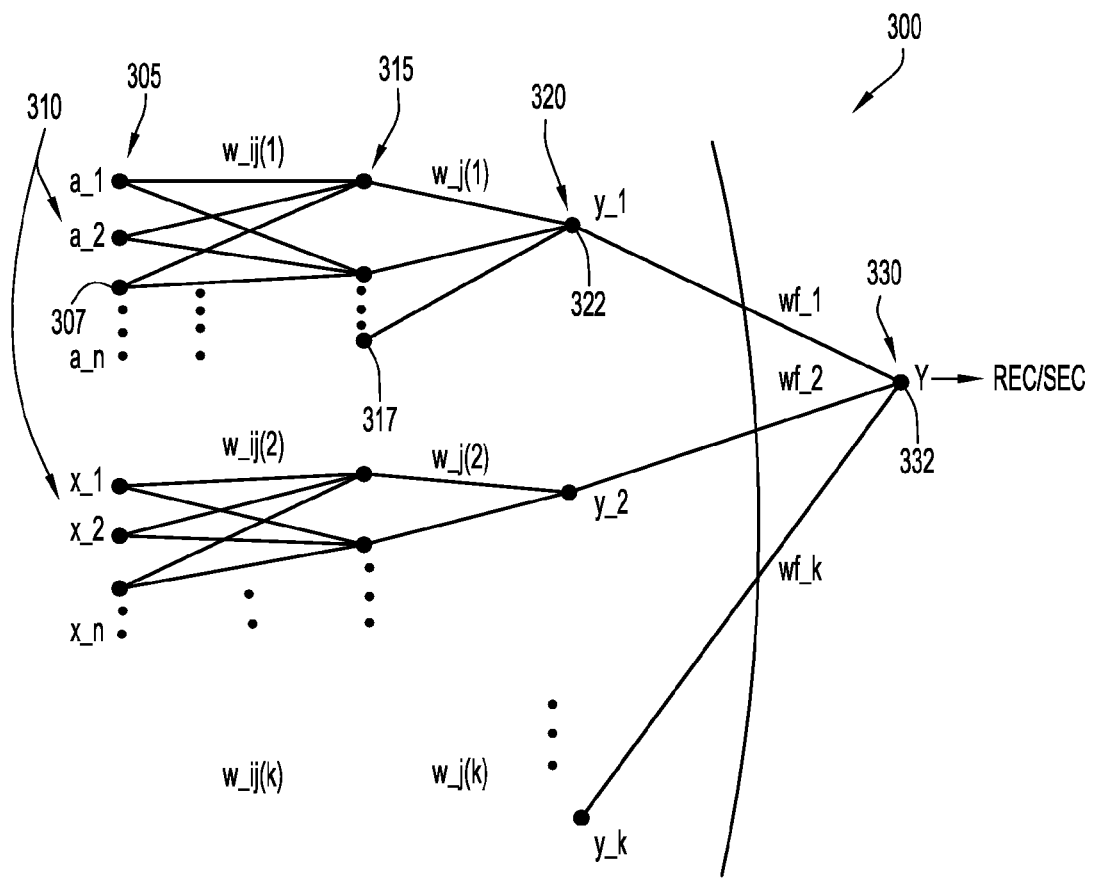
FIG. 3 is a schematic illustration of a neural network structure for generating a model of an information landscape according to an embodiment of the present invention.

A system of neural networks is modeled to associate various parameters of the information landscape with an output intended for optimization (e.g., records processed/second). An example neural network structure (employed by artificial neural networks module 280 via configuration server system 220) is illustrated in FIG. 3. Initially, neural network structure 300 includes a series of neural networks 310 each modeling a separate information landscape parameter (e.g., a, x, etc, as viewed in FIG. 3). By way of example, each of the parameters indicated above may be associated with a corresponding neural network 310. For example, a_i (where i varies from 1 to n) may represent batch sizes for n routines in information landscape 100, while x_i (where i varies from 1 to n) may represent location (e.g., encoded as numbers, etc.) of the n routines within information landscape 100.

Each neural network 310 associates a corresponding parameter with an intermediate output the parameter individually controls (e.g., y_1, y_2, . . . y_k as viewed in FIG. 3, where k represents the quantity of information landscape parameters or neural networks 310). The intermediate outputs are difficult to observe, or not directly observable, from information landscape 100. The intermediate outputs of neural networks 310 are combined to produce the overall output for neural network structure 300 as described below. Accordingly, neural network structure 300 includes a set of weights w_ij(r) and w_j(r) for each neural network 310, and an additional set of weights wf_r to combine the outputs of neural networks 310 to produce the overall output for the neural network structure as described below (e.g., where r varies from 1 to the quantity of parameters or neural networks, k, within neural network structure 300).

Each neural network 310 includes a series of stages 305, 315, 320, and a set of weights w_ij and w_j. Initial stage 305 includes one or more neurons (or processing nodes) 307 each associated with a value of the parameter corresponding to that neural network (e.g., a_1 . . . a_n, x_1 . . . x_n, etc. as viewed in FIG. 3). Neurons 307 of initial stage 305 basically provide output (e.g., the corresponding parameter values) to each neuron for processing node) of intermediate stage 315.

Intermediate stage 315 includes one or more neurons for processing nodes) 317 each connected to, and combining the parameter values or outputs of, each of the neurons 307 from initial stage 305. Each neuron 317 produces an output based on a weighted summation of the inputs to that neuron, where the outputs of neurons 317 are provided to a single neuron for processing node) of parameter output stage 320 producing the intermediate output (e.g., $y\_1, y\_2, \ldots y\_k$ as viewed in FIG. 3) as described below. Each connection between neurons of initial stage 305 and intermediate stage 315 is associated with a respective weight, $w\_{ij}$ (where i varies from 1 to the quantity of values for the parameter, n, as described above and indicates a neuron of initial stage 305 providing output for a parameter value), and j varies from 1 to the quantity of neurons in the intermediate stage, m, and indicates a neuron of intermediate stage 315 receiving that output). The weight is applied to the output (or parameter value) of the indicated initial stage neuron (e.g., initial stage neuron i) to provide a weighted output as an input to the indicated intermediate stage neuron (e.g., intermediate stage neuron j). Accordingly, the weighted outputs of initial stage neurons 307 are provided as inputs to neurons 317 of intermediate stage 315, where each neuron 317 combines these inputs in order to produce the weighted summation at intermediate stage 315.

Parameter output stage 320 includes a single neuron for processing node) 322 connected to, and combining the outputs from, each of the neurons 317 of intermediate stage 315. Neuron 322 produces an output based on a weighted summation of the inputs to that neuron. Each connection between neurons of intermediate stage 315 and the neuron of parameter output stage 320 is associated with a respective weight, $w\_j$ (where j varies from 1 to the quantity of intermediate stage neurons, m, as described above and indicates a neuron of intermediate stage 315 providing output). The weight is applied to the output of the indicated intermediate stage neuron (e.g., intermediate stage neuron j) to provide a weighted output as an input to parameter output stage neuron 322. Accordingly, the weighted outputs of intermediate stage neurons 317 are provided as inputs to neuron 322 of parameter output stage 320, where neuron 322 combines these inputs in order to produce the weighted summation (or intermediate output) at the parameter output stage. The resulting outputs from neurons 322 of neural networks 310 each represent the intermediate output (e.g., $y\_1, y\_2, \ldots, y\_k$ as viewed in FIG. 3) for the corresponding parameter, and the overall output for a corresponding neural network 310.

Output stage 330 of neural network structure 300 includes a single neuron 332 connected to, and combining the outputs from, neuron 322 of each of the neural networks 310. Each connection between neuron 322 of each of the neural networks 310 and neuron 332 of output stage 330 is associated with a respective weight, $wf\_r$ (where r varies from 1 to the quantity of parameters or neural networks, k, and indicates the neural network providing the intermediate output from the parameter output stage neuron). The weight is applied to the corresponding output (e.g., $y\_1, y\_2, \ldots y\_k$ as viewed in FIG. 3) of the indicated parameter output stage neuron (e.g., parameter output stage neuron r) to provide a weighted output as an input to the output stage neuron. Accordingly, the weighted intermediate outputs from neural networks 310 are combined by the output stage neuron 332 in order to produce the weighted summation (or output (Y)) at the output stage. The resulting output from neuron 332 represents the overall output of neural network structure 300 (e.g., Y as viewed in FIG. 3) and corresponds to operational performance of the information landscape (e.g., records processed/second, etc.). This output is observable by examining information landscape 100 (e.g., via system logs).

Neural network structure 300 may be represented by linear equations. For example, neural networks 310 may be represented by a linear equation as follows:

$$y\_r = \text{Summation over } j [w\_i * \text{Summation over } i(\text{parameter}\_i * w\_{ij})]; \quad \text{(Equation 1)}$$

where $y\_r$ represents the intermediate output at output stage 320 of a corresponding neural network 310, $w\_j$ represents the weight of the connection between neurons of the intermediate and parameter output stages of the corresponding neural network 310 as described above, parameter_i represents a value for a parameter within the parameter set for the corresponding neural network 310 (e.g., a, x, etc.) as described above, $w\_{ij}$ represents the weight of the connection between neurons of the initial and intermediate stages of the corresponding neural network 310 as described above, r varies from 1 to the quantity of parameters or neural networks, k, as described above, i varies from 1 to the quantity of parameter values, n, as described above, and j varies from 1 to the quantity of intermediate stage neurons, m, as described above.

The overall equation for the output, Y, of neural network structure 300 may be expressed as follows:

$$Y = \text{Summation over } r[wf\_r * y\_r]; \quad \text{(Equation 2)}$$

where $y\_r$ is the intermediate output of a neural network 310 and defined by Equation 1 above, $wf\_r$ represents the weight of the connection between the output parameter stage neurons of neural networks 310 and neuron 332 of the output stage as described above, and r varies from 1 to the quantity of parameters or neural networks, k, as described above. These equations represent a model of the information landscape that maps the parameters to a desired output, Y, or operational performance of the information landscape.

Once the weighted model (or neural network structure 300) for the information landscape has been established, an optimal combination of the parameter values that optimizes or maximizes the output, Y (e.g., operational performance such as records processed/second), is iteratively determined. This learning/optimizing process is performed in a loop that enables iterative fine-tuning of the parameters to optimize or maximize the output or operational performance of the information landscape (e.g., records processed/second) as described below.

Figure 4:
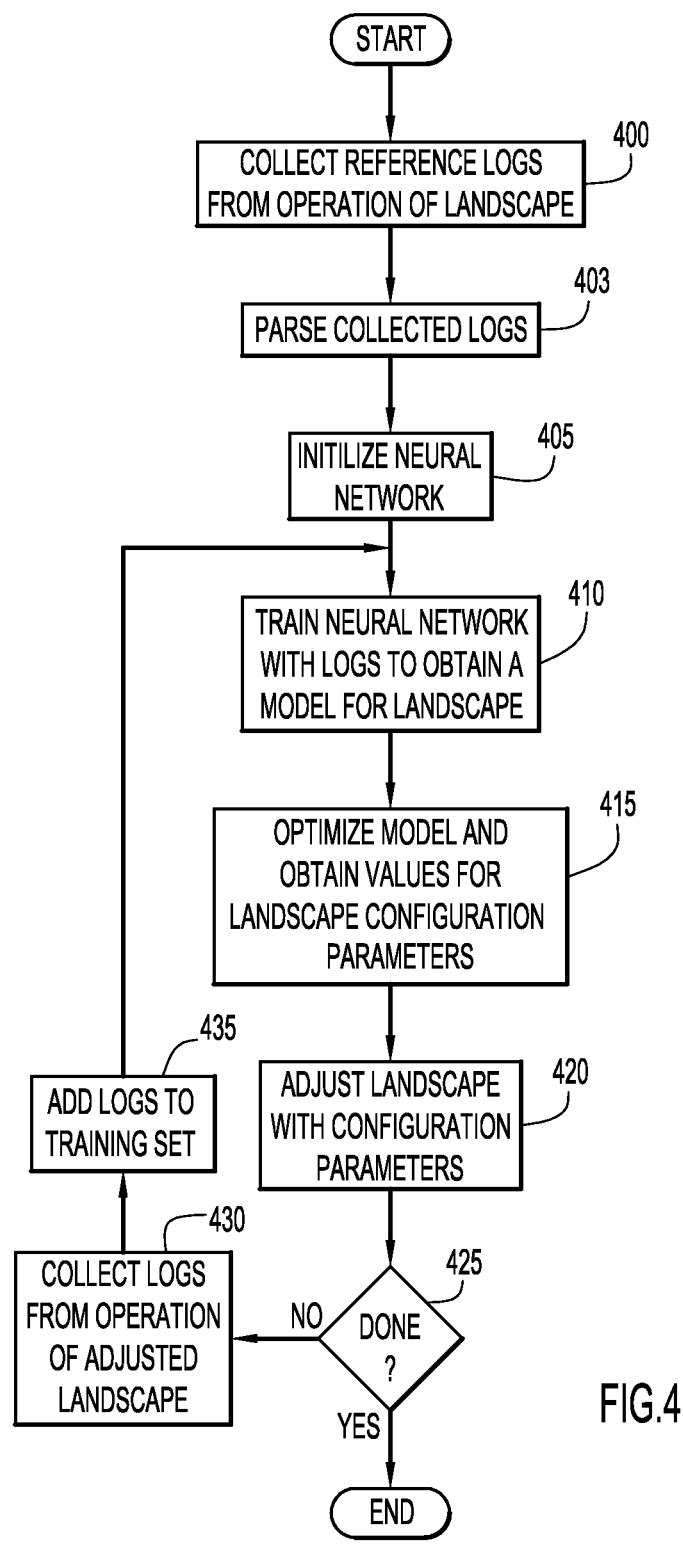
FIG. 4 is a procedural flowchart illustrating a manner of determining optimal configuration parameters for an information landscape according to an embodiment of the present invention.

A manner of determining optimal configuration parameters for an information landscape (e.g., via server systems 210, 220, 230) according to an embodiment of the present invention is illustrated in FIG. 4. Initially, reference logs are collected during operation of information landscape 100 at step 400 (e.g., via log extractor module 250 and information server system 210). The information within the collected logs are parsed, analyzed for structure, and formatted (e.g., via parse module 260 and information server system 210) for storage in database 235 of database server system 230 at step 403.

Neural network structure 300 is established and initialized at step 405 (e.g., via artificial neural networks module 280 and configuration server system 220). This typically includes associating the collected log data with parameters of the neural network structure and providing initial weights between the neurons or processing nodes.

The neural network structure is trained on the log information at step 410 (e.g., via artificial neural network module 280 and configuration server system 220) in order to determine values for the various weights (e.g., w_ij(r), w_j(r), wf_r, etc.) of the neural network structure and provide a model for the information landscape. In particular, training data for the neural network structure is ascertained from the collected logs stored in database 235. By way of example, the training data includes parameters of information landscape 100 (e.g., a, x, etc.) and the desired output (e.g., Y, representing operational performance such as records processed/second) ascertained from the collected log information, and may be of the following form:

{a_1,a_2, . . . ,a_n,x_1,x_2, . . . x_n, . . . ,Y}.

This training provides a model of the information landscape that connects or maps parameters of the information landscape (e.g., a, x, etc.) to the output desired for optimization (e.g., Y).

The training data is collected by observing different information landscape logs over a time period (through executing implementations of the information landscape). An example data structure for a log may be as shown below in Table I. The data structure may contain information including a host name, routine name, type of execution, subroutine name, sequence or order, start and end times, quantity of records processed, and status.

TABLE 1

| host | routine | type | run_type | subroutine | sequence | start | end | records | status |
|------|---------|------|----------|------------|----------|-------|-----|---------|--------|
| srv1 | cust_ld_1 | etl | parallel | stage_1 | 1 | 01:23:08 AM | 01:58:09 AM | 1046495 | S_OK |
| srv1 | Stage_1 | ntl_stage | parallel | None | 2 | 01:25:08 AM | 01:40:23 AM | 202023 | S_OK |
| — | — | — | — | — | | | | — | — |

The training set includes a plurality of tuples each with parameter values and the desired output (e.g., {a_1, a_2, . . . a_n, x_1, x_2, . . . x_n, . . . , Y}) ascertained from the collected log information. Once the training set is determined, the tuples (or values of the parameters and output) of the training set are employed by the neural network structure in order to determine values for the various weights (e.g., w_ij(r), wf_r, etc.) of the neural network structure based on the parameter and output values of each tuple. The values for the weights may be determined via any conventional or other neural network training techniques, and enable the neural network structure to produce the output, Y, from the parameter values for the tuples within the training set. In other words, the weight values enable the neural network structure to map the parameter values to the output.

Once the weights are determined for the neural network structure, a model of the information landscape is provided which may be expressed as follows.

$$Y = W \bullet X; \quad \text{(Equation 3)}$$

where Y is the desired output or operational performance, W is the known weight array (or weight values determined from the training set), and X is a vector of the information landscape parameters (e.g., a, x, etc.). This equation is similar to Equation 2 described above, and is in matrix form.

The determined model of the information landscape is optimized (e.g., via optimization module 270 and configuration server system 220) at step 415 in order to determine an optimal set of values for the configuration parameters that produce an optimal or maximum desired output based on the known weight values. In particular, the optimization determines the set of parameter values for the model (e.g., X in Equation 2) that yield the optimal or maximum desired output (e.g., Y in Equation 2) based on the weight values derived from training of the neural network structure (e.g., W in Equation 2). This may be accomplished by various conventional or other optimization techniques. For example, numerous conventional techniques of linear programming and optimization may be employed to optimize the output, Y, subject to constraints on the parameters, X. These constraints may be deduced from real-world considerations based on the nature of the parameters. By way of example, an upper limit may exist for a batch size, or certain jobs may only be able to execute at certain times of the day due to various reasons. In addition, limitations may exist for the degree of parallelism. The optimization techniques determine a value for each parameter that collectively optimizes or maximizes the output, thereby enabling these parameter values to be utilized for corresponding information landscape components to configure the information landscape. Thus, the information landscape configuration may be adjusted in an iterative manner to produce the desired output or operational performance.

Although the above example employs a linear transfer function (or model equation), present invention embodiments may employ any suitable neural network configuration and non-linear transfer functions (or model equations) (e.g., sigmoidal functions, threshold functions, etc.). However, the non-linear transfer functions are preferably employed in the first order neural networks (e.g., neural networks 310), where the intermediate outputs from these neural networks are combined linearly to provide an overall output of the neural network structure. These linear combinations of homogenous non-linear transfer functions may be solved and optimized in substantially the same manner described above via various conventional or other techniques.

The determined configuration parameters are provided to appropriate users or to information landscape components (e.g., via optimization module 270 and configuration server system 220) to adjust and optimize performance of the information landscape at step 420.

The optimization may be performed in an iterative manner to adjust the information landscape configuration. In particular, the information landscape with the adjusted parameters may operate, and additional logs may be collected (e.g., via log extractor module 250, parse module 260 and information server system 210) at step 430 in substantially the same manner described above. The information landscape may operate for one or more iterations, and may further include additional adjustments by users based on their experience with the information landscape or other criteria. Information from the newly collected logs is selected for the training process and added to the training set for neural network structure 300 at step 435 (e.g., via artificial neural network module 280 and configuration server system 220). The neural network structure is trained with the enhanced training set in order to determine the weight values (or adjusted information landscape model) and an optimal set of parameter values for the information landscape. The information landscape is adjusted based on those parameter values in substantially the same manner described above. This iterative adjustment of the information landscape may be performed continually, or at any desired time intervals (e.g., hours, days, weeks, months, etc.). The iterative adjustment of the information landscape continues until termination as determined at step 425.

It will be appreciated that the embodiments described above and illustrated in the drawings represent only a few of the many ways of implementing embodiments for optimally configuring an information landscape.

The computing environment of the present invention embodiments may include any number of computer or other processing systems or devices (e.g., server systems, etc.), and databases or other repositories arranged in any desired fashion, where the present invention embodiments may be applied to any desired type of computing environment (e.g., cloud computing, client-server, network computing, mainframe, stand-alone systems, etc).

The computer or other processing systems employed by the present invention embodiments may be implemented by any number of any personal or other type of computer or processing system (e.g., desktop, laptop, PDA, tables or other mobile computing devices, etc.), and may include any commercially available operating system and any combination of commercially available and custom software (e.g., communications software, server software, log extractor module, parse module, optimization module, artificial neural networks module, etc.). The computer systems may include any types of displays or monitors and input devices (e.g., keyboard, mouse, voice recognition, touch screen, etc.) to enter and/or view information.

It is to be understood that the software (e.g., log extractor module, parse module, optimization module, artificial neural networks module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., log extractor module, parse module, optimization module, artificial neural networks module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The computing environment may employ any number of any conventional or other databases, data stores or storage structures (e.g., files, databases, data structures, data or other repositories, etc.) to store information (e.g., log information, model, configurations and/or parameters, etc.). The database may be implemented by any number of any conventional or other databases, data stores or storage structures (e.g., files, databases, data structures, data or other repositories, etc.) to store information (e.g., log information, model, configurations and/or parameters, etc.). The database may be included within or coupled to the database or other server systems. The database and/or storage structures may be remote from or local to the computer or other processing systems, and may store any desired data (e.g., log information, model, configurations and/or parameters, etc.).

The information landscape may include any information, and any quantity of the same or different information systems, computer or processing systems, data integration operations, data stores, queries, warehouses, or other components arranged in any fashion.

The log information may include any desired information pertaining to an information landscape, and may be in any desired format. Any quantity of any types of parameters may be utilized for configuring the information landscape, while any quantity of any suitable attribute or characteristic of operational performance may be selected for enhancement based on the determined parameter values. For example, present invention embodiments may employ plural neural network structures each mapping parameters to a respective performance attribute. The determined parameters may be combined (e.g., mathematically, logically, etc.) in any fashion and applied to corresponding components of the information landscape to configure the information landscape in a manner to achieve desired performance.

The neural network structure may include any quantity of neural networks with any desired quantity, arrangement, or configuration of neurons. The neurons may perform any desired operations to produce an output (e.g., weighted sum, multiplication, addition, subtraction, division, algorithms, formulas, etc.). Alternatively, present invention embodiments may employ any quantity of any type of learning or self-adjusting system to map the parameters to a desired output (e.g., neural network, tunable functions, etc.).

Any conventional or other techniques may be employed to optimize the information landscape model (e.g., linear programming, optimization, etc.) and determine the parameter values providing the desired output. The optimal output may be a maximum, minimum, or some other intermediate value depending on the particular attribute or characteristic. For example, a maximum value for an output representing records processed would be beneficial, while a minimum value for an output representing execution time would be beneficial.

Any quantity of the determined parameters or parameter values (e.g., all values, a selected portion, etc.) may be utilized to adjust the configuration of the information landscape. Further, the adjustment of the information landscape may be performed continually or at any desired time intervals (e.g., hours, days, weeks, months, etc.) to control operational performance of the information landscape.

The present invention embodiments may employ any number of any type of user interface (e.g., Graphical User interface (GUI), command-line, prompt, etc.) for obtaining or providing information (e.g., information landscape parameters, logs, desired information landscape operational performance, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized to configure any information processing systems or environments to attain any desired operational performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of optimizing an information processing environment comprising:
   collecting information pertaining to operational behavior of the information processing environment, wherein the collected information includes a plurality of parameters for the information processing environment;
   establishing a neural network structure to associate the parameters to a desired operational performance characteristic for the information processing environment, wherein the neural network structure includes a series of neural networks each modeling a corresponding one of the parameters and an output node combining results of the neural networks to map the parameters to the desired operational performance characteristic of the information processing environment;
   training the neural network structure with the collected information from the information processing environment to produce a model for the information processing environment; and
   optimizing the model to determine values for the parameters and adjusting the information processing environment based on the determined parameter values to attain the desired operational performance of the information processing environment.

2. The method of claim 1, further comprising:
   collecting additional information pertaining to operational behavior of the adjusted information processing environment;
   training the neural network structure with the additional information to update the model for the information processing environment; and
   optimizing the updated model to determine updated values for the parameters and adjusting the information processing environment based on the determined updated parameter values.

3. The method of claim 1, wherein the neural network structure includes plural sets of weights for application to information transferred between nodes of the neural network structure, and training the neural network structure includes:
   determining values for the plural sets of weights that enable the neural network structure to associate parameter values with the desired operational performance characteristic, wherein the model includes the parameter values, determined sets of weights, and the desired operational performance characteristic.

4. The method of claim 3, wherein optimizing the model includes:
   determining values for the parameters that optimize the desired operational performance characteristic based on the determined sets of weights.

5. The method of claim 1, wherein training the neural network structure includes:
   producing training data for the neural network structure from the collected information from the information processing environment, wherein the training data includes values for the parameters and the desired operational performance characteristic.

6. The method of claim 1, wherein the information processing environment includes an information landscape employing a plurality of information processing systems each contributing to the desired operational performance characteristic of the information landscape.

* * * * *